(12) United States Patent
Garcia

(10) Patent No.: US 10,672,147 B2
(45) Date of Patent: Jun. 2, 2020

(54) EXTRINSIC CALIBRATION METHOD FOR CAMERAS OF AN ON-BOARD SYSTEM FOR FORMATION OF STEREO IMAGES

(71) Applicants: CONTINENTAL AUTOMOTIVE FRANCE, Toulouse (FR); CONTINENTAL AUTOMOTIVE GMBH, Hannover (DE)

(72) Inventor: Lucien Garcia, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 335 days.

(21) Appl. No.: 15/512,687

(22) PCT Filed: Aug. 24, 2015

(86) PCT No.: PCT/EP2015/001726
§ 371 (c)(1),
(2) Date: Mar. 20, 2017

(87) PCT Pub. No.: WO2016/045764
PCT Pub. Date: Mar. 31, 2016

(65) Prior Publication Data
US 2017/0287169 A1 Oct. 5, 2017

(30) Foreign Application Priority Data
Sep. 25, 2014 (FR) ...................................... 14 59047

(51) Int. Cl.
*G06T 7/80* (2017.01)
*H04N 13/246* (2018.01)

(52) U.S. Cl.
CPC .............. *G06T 7/85* (2017.01); *H04N 13/246* (2018.05); *G06T 2207/10021* (2013.01); *G06T 2207/30252* (2013.01)

(58) Field of Classification Search
CPC ................................ G06T 7/85; H04N 13/246
(Continued)

(56) References Cited

U.S. PATENT DOCUMENTS

2008/0036576 A1 2/2008 Stein et al.
2008/0144924 A1* 6/2008 Hoffmann ............ H04N 13/246
382/154
(Continued)

FOREIGN PATENT DOCUMENTS

DE 10 2008 008 619 A1 7/2008
DE 102008008619 A1 * 7/2008 ............. G03B 35/08
(Continued)

OTHER PUBLICATIONS

International Search Report, dated Dec. 4, 2015, from corresponding PCT application.
(Continued)

*Primary Examiner* — Frederick D Bailey
*Assistant Examiner* — Amir Shahnami
(74) *Attorney, Agent, or Firm* — Young & Thompson

(57) ABSTRACT

Disclosed is a method to calibrate an on-board stereo system. The method includes correlating the depth deviation of a point of a scene observed by the system with respect to a supposedly planar scene and the corresponding yaw deviation between the cameras of the system, then deducing therefrom a yaw calibration correction for the cameras. The comparison between the scene as observed and as expected consists in determining, via spatio-temporal filtering, a depth deviation between the observed depth of at least one point of a planar scene image formed in the image plane of first
(Continued)

camera, as positioned in the coordinate system of the other camera, and the expected depth of this point projected onto the planar scene from the first camera, then in determining the yaw calibration deviation between the cameras as a function of the deviation in depth averaged over a sufficient set of points.

20 Claims, 2 Drawing Sheets

(58) Field of Classification Search
USPC .......................................................... 348/47
See application file for complete search history.

(56) References Cited

U.S. PATENT DOCUMENTS

| | | | | |
|---|---|---|---|---|
| 2010/0020178 A1* | 1/2010 | Kleihorst | ................. | G06T 7/85 348/175 |
| 2012/0182397 A1* | 7/2012 | Heinzle | ..................... | G06T 7/80 348/47 |
| 2012/0308084 A1* | 12/2012 | Perrier | ..................... | G06T 7/20 382/107 |
| 2013/0038745 A1* | 2/2013 | Myokan | ................. | H04N 5/144 348/208.99 |

FOREIGN PATENT DOCUMENTS

| | | |
|---|---|---|
| EP | 2 541 498 A1 | 1/2013 |
| FR | 2 986 358 A1 | 8/2013 |
| JP | 2009-182879 A | 8/2009 |
| WO | 2011/079258 A1 | 6/2011 |

OTHER PUBLICATIONS

Wenyi Zhao et al., "Effects of Camera Alignment Errors on Stereoscopic Depth Estimates", Pattern Recognition, 1996, pp. 2115-2126, vol. 29, No. 12.

Thao Dang et al., "Continuous Stereo Self-Calibration by Camera Parameter Tracking", IEEE Transactions on Image Processing, Jul. 2009, pp. 1536-1550, vol. 18, No. 7.

* cited by examiner

EXTRINSIC CALIBRATION METHOD FOR CAMERAS OF AN ON-BOARD SYSTEM FOR FORMATION OF STEREO IMAGES

The present invention relates to an extrinsic calibration method for cameras used in an on-board stereoscopic system for formation of stereo images, which is intended in particular to be fitted in a motor vehicle.

BACKGROUND OF THE INVENTION

In the automotive safety field, the driver assistance systems can include a visual aid thanks to stereoscopic systems on-board vehicles. These systems are generally used for detecting obstacles located in the visual field upstream of these vehicles. A stereoscopic system indeed makes it possible to determine the distance between the vehicle and these upstream obstacles from two on-board cameras, arranged close to each other to provide stereo image pairs to a digital processing unit. By analyzing the disparity between the images provided in this manner, the system makes it possible to accurately identify the obstacles and the distance thereof to the vehicle.

The recognition of these obstacles is, moreover, notified to the driver by the driver assistance system. The reliability of the cameras can become decisive, for example when it is a matter of knowing in real time if, in the absence of obstacles signaled moreover, the road is definitely free of obstacles.

The accuracy is dependent on the calibration of the cameras and the knowledge of possible variations with respect to an initial calibration. The calibration of the cameras relates to the intrinsic parameters, such as setting the focal length thereof or the zoom thereof, and to the extrinsic parameters thereof relating to the position of each camera with respect to the vehicle and to the relative position of the cameras, with respect to each other.

Each camera is initially calibrated intrinsically in the factory and, for the supplier, the intrinsic parameters are considered to be constant for the entire duration of use.

Conventionally, since one of the cameras is considered to be the reference camera, the extrinsic calibration consists in setting the position and the rotation of this reference camera with respect to the vehicle and with respect to the rotation of the other camera, called the slave camera. The position of the cameras must be set very precisely with respect to each other to prevent any error of perpendicularity of the position thereof with respect to the spacing thereof. Yet, it is difficult to assemble them precisely enough to obtain a yaw zero offset and thus prevent this error.

Furthermore, the extrinsic parameters vary over time due to the variations in the parameters of use, in particular the variations due to the temperature or to the mechanical vibrations endured by the cameras.

With reference to an orthogonal coordinate system OXYZ of a stereoscopic system, the calibration of the relative rotation of the cameras about the transverse axis OX (pitch angle), the longitudinal axis OZ (roll angle) and the elevation axis OY (yaw angle) can advantageously be carried out by applying the epipolar constraint used in the search for the stereoscopic matching of the points in a so-called epipolar geometry space. This geometry establishes the relationships between the points of various images of a same scene (image points), produced on the basis of different viewpoints, these image points corresponding to the projections in the image space of the cameras of a same object point of the scene.

The epipolar constraint makes it possible to limit the search, in a given image, for the image point of an object point on a projection line called an epipolar line, while only the position of the image point in the other image is known. The epipolar constraint thus guides the construction of a stereoscopic image via the search for the matching points between each point of a mono acquisition first image, produced by a first camera, and the points of the epipolar line of the other image, produced simultaneously by the other camera. Epipolar geometry makes it possible to deduce, by simple relationships, the corresponding image points in conjunction with the depth of field thereof in order to reconstruct stereoscopic images, i.e. in three-dimensional vision.

However, the pixilation of the images has an impact on the quality thereof. This impact can be measured for the roll or pitch calibration since the detection of the calibration error can then be directly measured on the image. For example, a roll or pitch rotation of a degree will cause a deviation of 10 pixels on the image and this will be visible. However, the yaw deviation cannot be corrected on the image since the sensitivity is too low: the projection deviation on the epipolar line remains too small with respect to the image noise—less than 0.1 pixel on average for a shift of one degree—and the epipolar constraint cannot then be utilized.

To rectify this problem, and more generally to overcome the camera precise assembly error—which is particularly manifested on the yaw calibration—it could be envisaged to use additional external information, such as the vehicle speed or the depth of the scene from another sensor.

For example, the use of a radar allows an object—for example a vehicle—to be located at a given distance. The same vehicle is then observed with a first camera of the stereo system and the angle thereof calibrated with the other camera such that the vehicle is indeed at the given distance. However, the radar is not precise enough and therefore needs to take a large number of coordinate system points. Moreover, this radar generates an additional cost.

Other developments have been explored without the constraint of using a radar, using only the image processing system.

Thus, the patent document FR 2986358 describes the calibration of a camera mounted on a vehicle based on capturing specific target points located on a test pattern. By solving a system of nonlinear equations with six unknowns, three translational components and three rotational components, a point of coordinates given in the camera image plane is then positioned in the scene.

This solution is difficult to apply to the yaw calibration between two cameras of a stereoscopic system since the complexity of the system does not make it possible to produce unambiguous determinations for two moving cameras from a same test pattern.

The international patent application WO 2011/079258 proposes determining the real-time miscalibration of a multi-camera system, more particularly the extrinsic miscalibration thereof, and re-calibrating it, from the correspondence between observed data of an image—by the measurements thereof—and those provided according to the application of the calibration previously set. The correspondence of the data, which relates to features of typical object models, is stored as historical statistics of the alignment scores measured in real time.

However, this solution relates to systems with at least three multiple cameras and uses several multiple model objects, such as circles, or a 3D (three-dimensional) model, such as a cylinder, to implement the method. The use of standard models restricts the use of this method. In addition, the performances in determining the miscalibration, in particular the yaw miscalibration for an on-board stereoscopic system, are not measurable.

SUMMARY OF THE INVENTION

The aim of the invention is to calibrate an on-board system of stereoscopic cameras, in a reproducible manner and without being sensitive to the irregularities of the road or to the image noises produced by these cameras. To this end, the invention proposes correlating the depth deviation of a point of a scene observed by the system with respect to the supposedly planar scene and the yaw corresponding variation between the cameras of the system, then deducing therefrom a yaw calibration correction for the cameras.

To this end, the object of the present invention is an extrinsic calibration method for a first and a second camera of a stereoscopic system for formation of stereo images, which is on-board a motor vehicle, including the following steps:

acquiring roll, pitch and yaw stereo extrinsic and mono intrinsic calibrations for the cameras;

acquiring successive stereoscopic images of a scene in a field of vision by reconstruction of three-dimensional images calibrated using the previous calibration step, each stereoscopic image being reconstructed from left and right images of the first and second cameras produced simultaneously and digitally stored as pixels;

filtering the stereoscopic images produced in this manner;

comparing, using spatio-temporal filtering with a predetermined number of points, a profile of the scene as observed via each reconstructed image and a linear profile of the scene as expected;

establishing a yaw calibration deviation from the previous comparison;

correcting the yaw calibration of the cameras on the basis of the deviation in yaw calibration determined by the previous step; and iterating the correction of the previous step until obtaining a zero-calibration deviation by repeating the previous steps.

According to preferred implementation methods:

the comparison between profiles of the scene as observed and as expected consists in determining a field depth deviation between a field depth of the scene as observed and a field depth of at least one point of the linear profile scene as expected, then in determining the yaw calibration deviation between the first and second cameras as a function of the deviation in depth averaged over a predetermined set of points;

the observed depth of field of an image point of the scene formed by the first camera is determined as a function of a disparity between the images of the cameras;

the distance between said first camera and the image point is equal to the product of the focal length of the first camera and of a distance between the cameras divided by the disparity between the images of the cameras;

the expected depth is determined by a transition matrix between a coordinate system of said first camera and a coordinate system of the vehicle;

the yaw calibration deviation is, for each image point, proportional to the depth deviation and inversely proportional to the square of the expected depth;

the yaw calibration deviation between the first and the second camera corresponds to a convergence, or a divergence, respectively, between these cameras, depending on whether the profile of the observed scene is generally inclined with a generally positive slope or generally negative slope, respectively, with respect to the generally zero slope profile expected scene;

a yaw angle elementary variation dL between the first and the second camera as a function of an elementary depth deviation dZ, between a same point as observed and as expected of the observed profile of the scene and of the expected linear profile of the scene, respectively, is given by the following formula:

$$dL = \frac{-dZ * b}{(Z^2 * (1 + Un^2))},$$

wherein "b" is a distance between the cameras, "Z" is the expected depth of the point in the linear profile scene, "Un" is a normalized transverse coordinate of an image point corresponding to the point observed in a two-dimensional image coordinate system of the first camera (where $$Un = \frac{(Ui - U0)}{f},$$

"Ui" being a transverse coordinate of the image point in an image plane of the first camera, "U0" a centered coordinate in said image and "f" a focal length of said first camera).

BRIEF DESCRIPTION OF THE DRAWINGS

Other data, features and advantages of the present invention will emerge upon reading the non-limiting detailed description hereafter, with reference to the appended figures wherein, respectively.

DETAILED DESCRIPTION OF THE PREFERRED EMBODIMENTS

Figure 1:
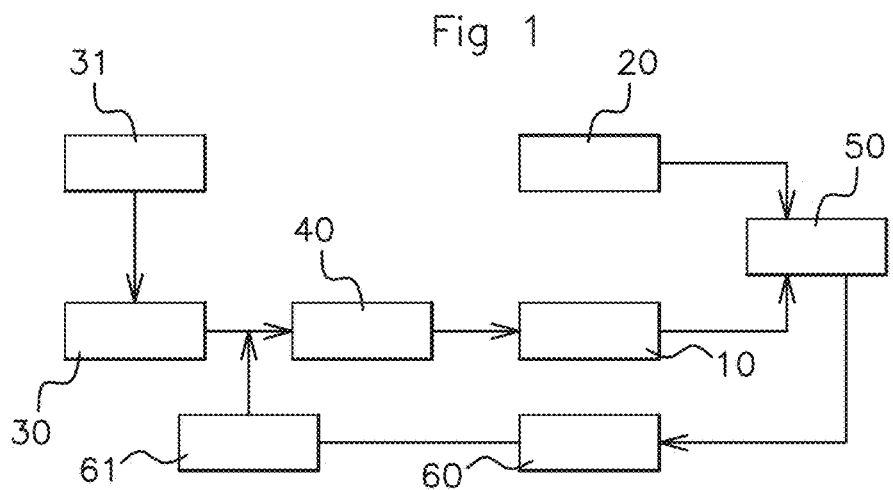
FIG. 1 is a logic diagram of the yaw calibration according to the method of the present invention.

The logic diagram of FIG. 1 illustrates the implementation of the extrinsic calibration method according to the invention for a stereoscopic camera system on-board a vehicle, starting from a step 10 for acquiring images of the road which are observed by the system and from a parallel acquisition step for images of the road as are expected (step 20), i.e. for images of the road considered as planar. The on-board stereoscopic system includes, in addition to the cameras, a unit for processing the data coming from these cameras in order to construct three-dimensional images.

Each image of the route observed (step 10) comes from a so-called 3D calibrated three-dimensional reconstruction image produced from a large number of points—for example 100 000 points—seen by the cameras of the stereoscopic system. The depth of these points is determined from a map for disparities between the left and right images formed by the corresponding cameras.

To reconstruct each 3D image at the step 30, a stereo extrinsic and mono intrinsic initial calibration acquisition step 31 is filtered at the step 40.

The depth of each 3D reconstructed and observed image of the step 10 is then compared to the corresponding expected image of the step 20 of the supposedly planar road. Each expected image is formed by the reference 2D two-dimensional image of one of the cameras of the stereoscopic system, this same reference image being used to produce the corresponding 3D reconstructed image. The image of the road is assumed to be planar, following a spatio-temporal filtering with a predetermined number of points. Therefore, several points on several consecutive images are used to obtain an average profile of the image of the road. This predetermined number is at least equal to one but, given the acquisition noise and the more or less irregular profile of the road, it is advantageous to take several points on several consecutive images. The number of useful images is dependent upon the speed of the vehicle and the desired calibration accuracy. A depth deviation is then established at the step 50 from this comparison.

A prior calibration can be conducted in order to empirically establish the correlation between a depth deviation and the corresponding yaw angle deviation. A deterministic approach for this correlation is proposed below.

The yaw calibration deviation due to a yaw variation between the cameras is thus determined at the step 60 and injected at the step 61 as image correction into the reconstruction of the 3D image as established at the step 30. With each establishment of a new yaw angle calibration deviation, the calibration is thus successively corrected. This iteration is continued so long as the correction to be provided at the step 30 and determined at the step 60 is not zero.

Figure 2A:
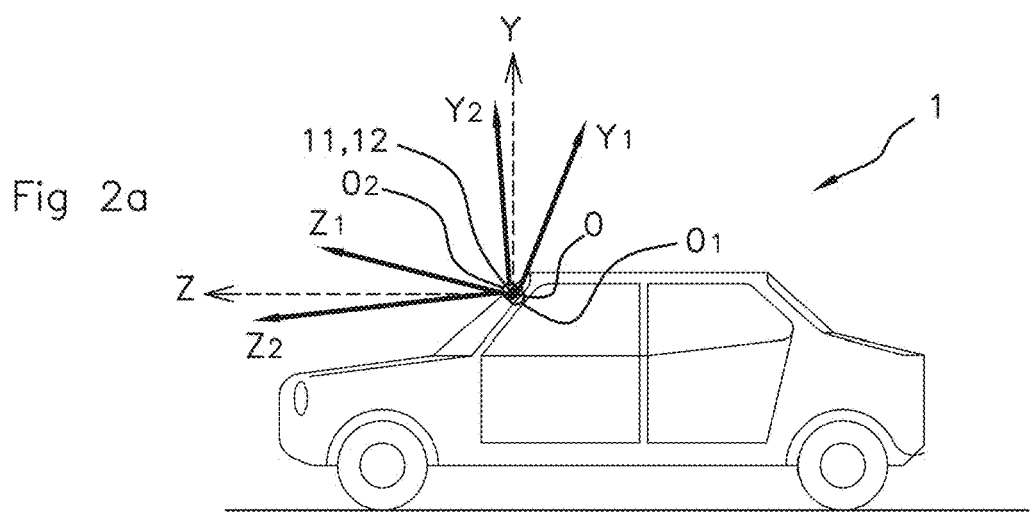
FIGS. 2a and 2b are side and top views of a vehicle in which the cameras of a stereoscopic system are assembled on a loading supporting means.
Figure 2B:
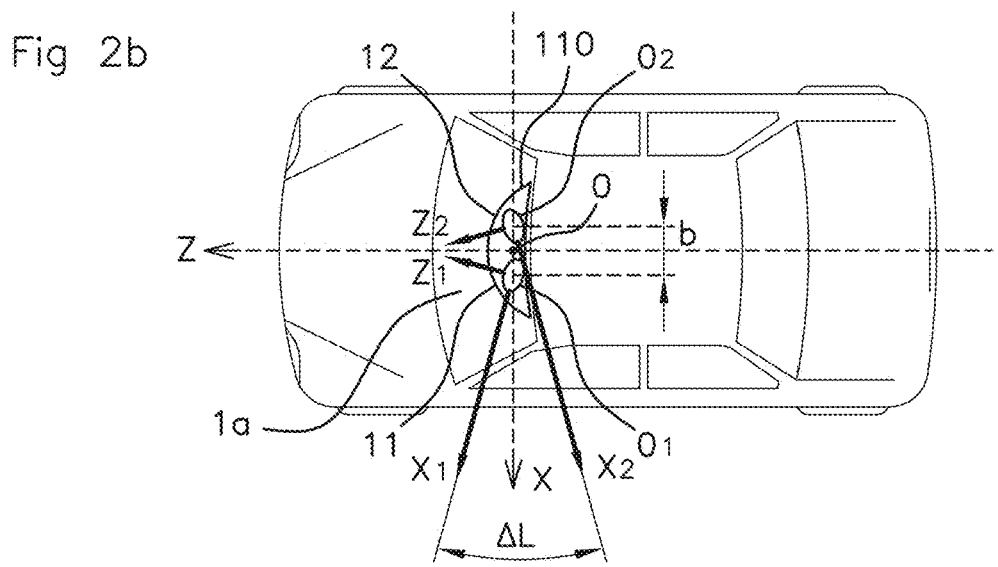

As illustrated by the side and top views of FIGS. 2a and 2b, the cameras 11 and 12 of the stereoscopic system are assembled on a loading supporting means 110 arranged on the upper part of the windshield 1a of the vehicle 1. Also shown in these figures are the coordinate systems O1X1Y1Z1, O2X2Y2Z2 and OXYZ, centered on the optical centers O1, O2 and O, respectively, of the first camera 11, of the second camera 12 and of the stereoscopic system, these coordinate systems being linked to said cameras 11 and 12 and to the vehicle 1, respectively. The distance between the cameras is measured by the distance between the optical centers O1 and O2 thereof, which is designated by "b" in the figure.

More particularly, the angular offset $\Delta L$ between the two-dimensional coordinate sub-systems X1O1Z1 and X2O2Z2 of the cameras 11 and 12 (FIG. 2b) shows the yaw deviation between the cameras 11 and 12. In FIG. 2b, this yaw deviation $\Delta L$ is illustrated between the axes O1X1 and O2X2 of said dimensional coordinate sub-systems, but could equally be shown by the angular offset between the axes O1Z1 and O2Z2 which form the optical axes of the cameras 11 and 12.

Yet, the depth deviation is considered, according to the invention, as revealing a yaw calibration error between the cameras due to this angular offset $\Delta L$. Referring to the side views of profiles of the road according to FIGS. 3a and 3b, this depth deviation is illustrated in the plane Y1O1Z1 of the vehicle 1, perpendicular to the image plane of the first camera 11. In these figures, the actual profile 121 of the road defines on average—by spatio-temporal filtering—a so-called reference linear profile as expected 120.

Also shown in these figures is the road 130 profile as observed by the on-board stereoscopic system, according to a generally ascending 13a (FIG. 3a) or descending 13b (FIG. 3b) profile corresponding to a yaw angle error of the cameras, that is convergent and divergent respectively, which generates the yaw calibration error.

The yaw angle deviation of the cameras comes from a mistake or a variation in the installation of either of the cameras of the system, such as the camera 11, on the loading supporting means 110 thereof. Furthermore, the inclination of the profile of the road as observed 13a or 13b in the two cases (FIGS. 3a and 3b) is all the greater since the angle error and therefore the yaw calibration error is large.

In the first case (FIG. 3a), any point P1a of the road profile observed 13a is seen by the stereoscopic system to be closer than the corresponding point P2a of the reference linear profile 120 as expected, the points P1a and P2a being on the line Da passing through the optical center "O" of the stereoscopic system. This optical center coincides, in the side view according to FIGS. 2a and 2b, with the optical center O1 of the camera 11. The point P1a "being closer" results from the positive inclination of the profile 13a.

The depth deviation $\Delta Za$ between the points P1a and P2a is measured along the axis O1Z1. This deviation $\Delta Za$ increases with the distance of the point P1a considered along the axis O1Z1, due to the inclination of the profile observed 13a with respect to the reference linear profile 120. Obstacles can then appear in the field of vision of the stereoscopic system on the actual road corresponding to the profile 121 and can be excluded for example by filtering (step 40, FIG. 1).

In the second case (FIG. 3b), any point P1b of the road profile observed 13b is seen by the stereoscopic system to be further away than the corresponding point P2b of the reference linear profile 120, the points P1a and P2b being on the line Db passing, in projection on this side view, through the optical center O1 of the camera 11. The point P1b "being further away" is due to the negative inclination of the profile 13b.

The depth deviation $\Delta Zb$ between the points P1b and P2b is also measured along the axis OZ. This deviation $\Delta Zb$ increases with the distance of the point P1b considered due to the inclination of the profile observed 13b with respect to the reference linear profile 120.

Therefore, it appears to be important to be able to correct the stereoscopic system yaw calibration deviation which is "convergent" or "divergent" (due to the vibrations, the initial calibration and/or the thermal effects) and which leads to positive or negative inclination profiles, respectively.

In addition to the empirical methods stated above, the invention also proposes a quantified correction method for the yaw calibration via correlation between the yaw variation $\Delta L$ formed between the cameras—causing the yaw calibration deviation—and the depth deviation $\Delta Z$, namely $\Delta Za$ or $\Delta Zb$ according to the two cases described above, which is deduced therefrom.

Figure 4:
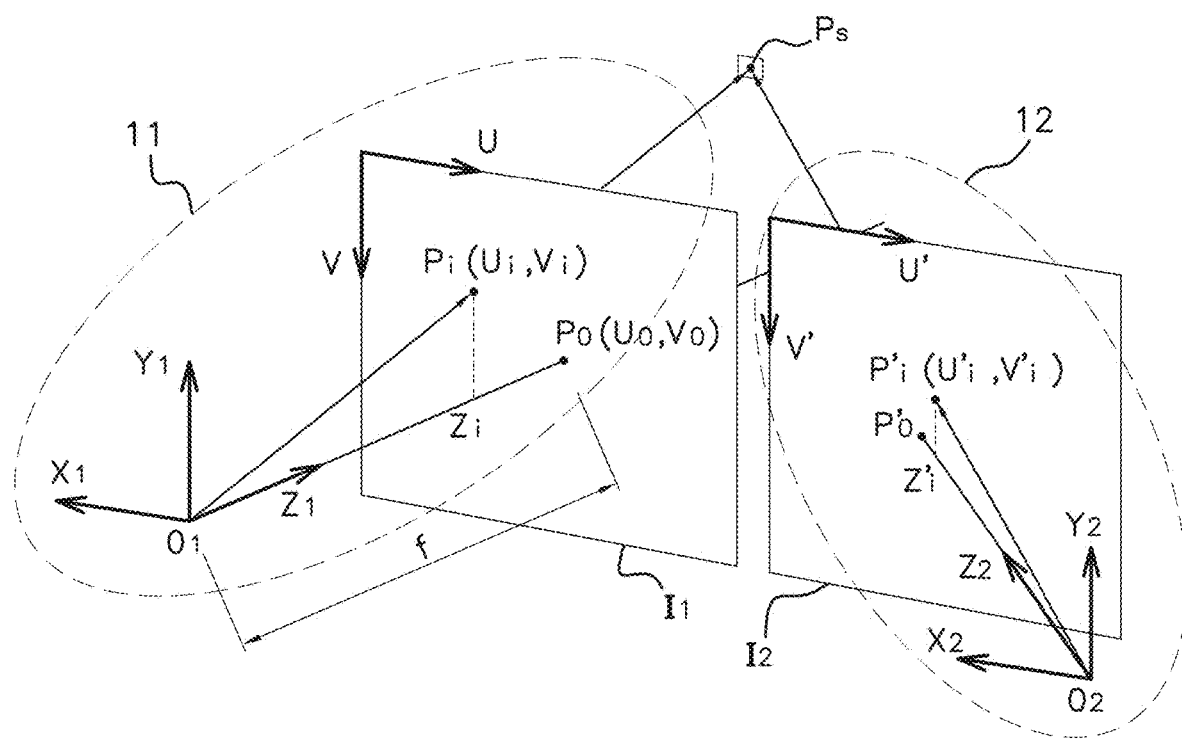
FIG. 4 is a perspective view of the image plane of the first camera of the stereoscopic system.

To establish such a correlation, it is recommended to start from the positioning of an image point Pi of the observed scene in an image plane I1 of the camera 11, as illustrated by the perspective view of FIG. 4. The camera 11 (symbolically indicated by an outline in dotted line) has the optical center O1, which is the center of the coordinate system O1X1Y1Z1 defining an optical axis O1Z1, which is assumed in this case to be parallel with the roll longitudinal axis OZ of the stereoscopic system (FIGS. 2a, 2b), a transverse axis O1X1, assumed in this case to be parallel with the pitch axis OX of this system, and an elevation axis O1Y1, parallel with the yaw axis OY of the stereoscopic system. The camera 11 also has a focal length "f" equal to the distance between the image plane I1 thereof and the optical center thereof O1.

In the coordinate system (U, V) of the image plane I1, the camera 11 forms the image point Pi of an object point Ps of the scene with Ui and Vi for coordinates, Ui being the transverse coordinate (parallel with the axis O1X1) and Vi the elevation coordinate (parallel with the axis O1Y1). Normalized coordinates $$Un = \frac{(Ui - U0)}{f} \text{ and } Vn = \frac{(Vi - V0)}{f}$$

of the point Pi are defined with reference to the coordinates U0 and V0 of the main point P0, where the optical axis O1Z1 of the camera 11 perpendicularly penetrates the image plane I1.

The other camera 12 of the stereoscopic system, which camera is illustrated in a similar manner to the camera 11, forms—in an identical manner to the camera 11—an image point P'i of the object point Ps with coordinates U'i and V'i in the coordinate system (U', V') of the image plane I2 thereof with main point P'0. The reference coordinate system O2X2Y2Z2 of the camera 12 is centered on the optical center O2 of this camera, the axis O2Z2 forming the optical axis thereof.

Figure 3B:
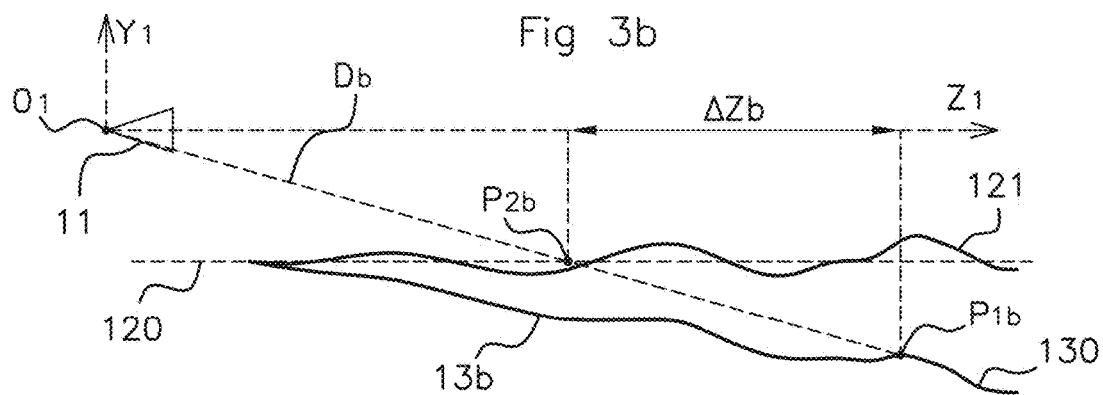
FIG. 3b is a side view of the various profiles of the road according to FIG. 3a, in the case of a divergent yaw error between the cameras.
Figure 3A:
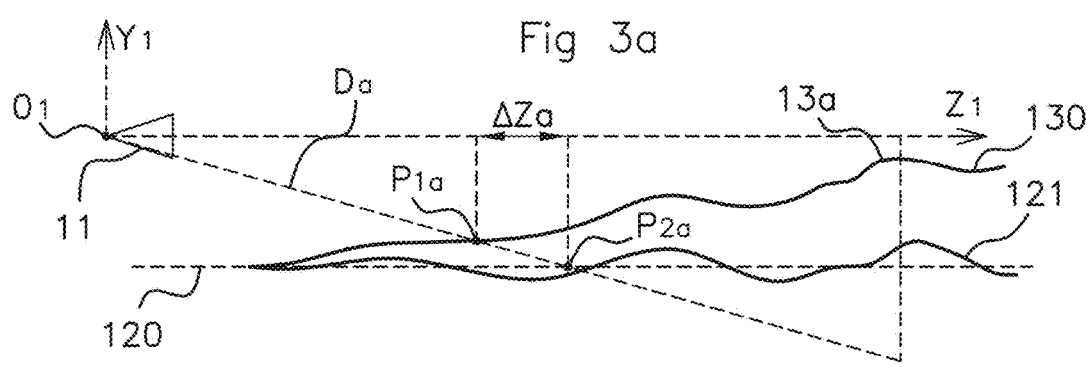
FIG. 3a is a side view of various profiles of the road: the supposedly linear profile, the actual profile to be travelled by the vehicle, and the profile as observed by a stereoscopic system on-board the vehicle—through a first camera in the coordinate system of the second camera—, in the case of a convergent yaw error between the cameras of the system.

The yaw angle elementary variation dL between the two cameras 11 and 12 of the system is then determined as a function of an elementary depth deviation dZ—corresponding to the finite deviations ΔZa or ΔZb of FIGS. 3a and 3b—which is formed on the longitudinal axis O1Z1. The elementary depth deviation dZ is measured by the deviation between the depth Zi of the point Pi on the axis O1Z1 and the depth Z'i of the point P'i which is the image point of the point Ps as observed in the image plane I2 of this camera 12 using the stereoscopic image reconstruction epipolar method.

The correlation between a yaw angle elementary variation dL and the corresponding elementary depth deviation dZ is then given by the formula:

$$dL = \frac{-dZ * b}{(Z^2 * (1 + Un^2))},$$

b being the distance between the optical centers of the cameras (cf. FIG. 2b). Thus, it appears that the yaw angle variation dL is dependent upon the depth Zs squared of the object point P's as expected in a scene considered to be planar. This strong dependence leads to the steep inclination of the road profiles as observed by the stereoscopic system on-board the vehicle, in the case of a convergent or divergent yaw angle between the cameras of the system (cf. FIGS. 3a and 3b).

The invention is not limited to the examples described and shown. Thus, the invention can be used for systems with more than two cameras by using the method for each set of cameras of the system (two, three, four, etc.).

Moreover, it is possible to use any three-dimensional image reconstruction method that can produce disparity maps in order to determine the depths of the points of a scene from the images provided by the cameras of a stereoscopic system, for example local, global and semi-global methods depending on the mode of determining the matching scores, the cutting of the images and the mode of expressing the disparities.

The local methods are based on scores for matching each pair of pixels of each image which are obtained between the pixels which immediately surround two pixels to be matched. Various correlation functions can be used (sum of the square deviations, sum of the absolute deviations, centered normalized inter-correlation, etc.) in order to then determine the disparities of the matched pixels. For each analyzed pair of pixels, the disparity corresponding to the best score is selected.

The global methods consist in optimizing an energy function defined on the entire reference image. The energy function defines the constraints that the disparity map must observe, for example the continuity of the disparity on the objects. Subsequently, all of the disparities which minimize this energy function are sought. The graph cut method and the belief propagation are the most studied global methods.

The semi-global methods are based on the same principle as the global methods but on sub-portions of the image, namely lines or blocks. Splitting the energy function optimization problem into sub-problems allows for reducing the need for calculating and memory resources compared to the global methods.

The invention claimed is:

1. An extrinsic calibration method for a first (11) and a second (12) camera of a stereoscopic system for formation of stereo images, said system on-board a motor vehicle (1), comprising the steps of:
    an initial calibration step (31) of acquiring roll, pitch and yaw stereo extrinsic and mono intrinsic calibrations for the first and second cameras, including a yaw calibration of the cameras;
    acquiring successive stereoscopic images of a scene in a field of vision by reconstructing three-dimensional images calibrated using the initial calibration step, each stereoscopic image of the successive stereoscopic images being reconstructed from left and right images produced simultaneously by the first and second cameras (11, 12), respectively, and digitally stored as pixels;
    filtering the reconstructed stereoscopic images;
    comparing, using spatio-temporal filtering with a predetermined number of points, a profile of the scene as observed via each reconstructed image (10) and a linear profile of the scene (120) as expected, and generating an angular yaw calibration deviation (ΔL) therefrom;
    correcting the yaw calibration of the cameras (11, 12) on the basis of the generated yaw calibration deviation (ΔL); and
    iterating the steps of filtering, comparing, and correcting until the generated yaw calibration deviation (ΔL) is zero.

2. The calibration method as claimed in claim 1, wherein the comparing of the profile of the scene as observed and the linear profile of the scene as expected includes the sub-steps of determining a field depth deviation (Δa, ΔZb) between a field depth of at least one point (P1a, P1b) of the scene as observed and a field depth of at least one point (P2a, P2b) of the scene as expected (120), and then determining the yaw calibration deviation (ΔL) between the first and second cameras (11, 12) as a function of the field depth deviation averaged over a determined set of points.

3. The calibration method as claimed in claim 2, wherein the observed depth of field of an image point (Pi) of a planar scene formed by the first camera (11) is determined as a function of a disparity between the images produced by the first and second cameras (11, 12).

4. The calibration method as claimed in claim 3, wherein a distance between said first camera (11) and the image point (Pi) is equal to the product of a focal length (f) of the first camera (11) and a distance (b) between the first and second cameras (11, 12) divided by the disparity between the images of the first and second cameras.

5. The calibration method as claimed in claim 2, wherein an expected depth (Zs) is determined by a transition matrix between a coordinate system (O1X1Y1Z1) of said first camera (11) and a coordinate system (OXYZ) of the vehicle (1).

6. The calibration method as claimed in claim 2, wherein the yaw calibration deviation (ΔL) is, for each image point (Pi), proportional to the field depth deviation (ΔZa, ΔZb) and inversely proportional to the square of the expected depth (Zs).

7. The calibration method as claimed in claim 2, wherein the yaw calibration deviation (ΔL) between the first (11) camera and the second (12) camera corresponds to a convergence, or a divergence, respectively, between the optical axes (O1Z1, O2Z2) of the cameras (11, 12), depending on whether the profile of the observed scene (130) is generally inclined with a generally positive slope (13a) or a generally negative slope (13b), respectively, with respect to a generally zero slope of the linear profile of the scene (120) as expected.

8. The calibration method as claimed in claim 2, wherein a yaw angle elementary variation dL between the first (11) camera and the second camera (12), as a function of an elementary depth deviation dZ, between a same point as observed (P1a, P1b) and as expected (P2a, P2b) of the observed profile of the scene (130; 13a, 13b) and of the expected linear profile of the scene (120), respectively, is given by the formula $$dL = \frac{-dZ * b}{(Z^2 * (1 + Un^2))},$$

where

"b" is a distance between the cameras,

"Z" is the expected depth of the point (P2a, P2b) in the linear profile scene (120), and "Un" is a normalized transverse coordinate of an image point (Pi) corresponding to the point observed in a two-dimensional image coordinate system of the first camera, where $$Un = \frac{(Ui - U0)}{f},$$

"Ui" being a transverse coordinate of the image point in an image plane of an image of the first camera (11), "U0" being a centered coordinate in said image, and "f" being a focal length of said first camera (11).

9. The calibration method as claimed in claim 3, wherein an expected depth (Zs) is determined by a transition matrix between a coordinate system (O1X1Y1Z1) of said first camera (11) and a coordinate system (OXYZ) of the vehicle (1).

10. The calibration method as claimed in claim 4, wherein an expected depth (Zs) is determined by a transition matrix between a coordinate system (O1X1Y1Z1) of said first camera (11) and a coordinate system (OXYZ) of the vehicle (1).

11. The calibration method as claimed in claim 3, wherein the yaw calibration deviation (ΔL) is, for each image point (Pi), proportional to the field depth deviation (ΔZa, ΔZb) and inversely proportional to the square of the expected depth (Zs).

12. The calibration method as claimed in claim 4, wherein the yaw calibration deviation (ΔL) is, for each image point (Pi), proportional to the field depth deviation (ΔZa, ΔZb) and inversely proportional to the square of the expected depth (Zs).

13. The calibration method as claimed in claim 5, wherein the yaw calibration deviation (ΔL) is, for each image point (Pi), proportional to the field depth deviation (ΔZa, ΔZb) and inversely proportional to the square of the expected depth (Zs).

14. The calibration method as claimed in claim 3, wherein the yaw calibration deviation (ΔL) between the first (11) camera and the second (12) camera corresponds to a convergence, or a divergence, respectively, between the optical axes (O1Z1, O2Z2) of the cameras (11, 12), depending on whether the profile of the observed scene (130) is generally inclined with a generally positive slope (13a) or a generally negative slope (13b), respectively, with respect to a generally zero slope of the linear profile of the scene (120) as expected.

15. The calibration method as claimed in claim 4, wherein the yaw calibration deviation (ΔL) between the first (11) camera and the second (12) camera corresponds to a convergence, or a divergence, respectively, between the optical axes (O1Z1, O2Z2) of the cameras (11, 12), depending on whether the profile of the observed scene (130) is generally inclined with a generally positive slope (13a) or a generally negative slope (13b), respectively, with respect to a generally zero slope of the linear profile of the scene (120) as expected.

16. The calibration method as claimed in claim 5, wherein the yaw calibration deviation (ΔL) between the first (11) camera and the second (12) camera corresponds to a convergence, or a divergence, respectively, between the optical axes (O1Z1, O2Z2) of the cameras (11, 12), depending on whether the profile of the observed scene (130) is generally inclined with a generally positive slope (13a) or a generally negative slope (13b), respectively, with respect to a generally zero slope of the linear profile of the scene (120) as expected.

17. The calibration method as claimed in claim 6, wherein the yaw calibration deviation (ΔL) between the first (11) camera and the second (12) camera corresponds to a convergence, or a divergence, respectively, between the optical axes (o1Z16, O2Z2) of the cameras (11, 12), depending on whether the profile of the observed scene (130) is generally inclined with a generally positive slope (13a) or a generally negative slope (13*b*), respectively, with respect to a generally zero slope of the linear profile of the scene (120) as expected.

18. The calibration method as claimed in claim 3, wherein a yaw angle elementary variation dL between the first (11) camera and the second camera (12), as a function of an elementary depth deviation dZ, between a same point as observed (P1*a*, P1*b*) and as expected (P2*a*, P2*b*) of the observed profile of the scene (130; 13*a*, 13*b*) and of the expected linear profile of the scene (120), respectively, is given by the formula $$dL = \frac{-dZ * b}{(Z^2 * (1 + Un^2))},$$

where
"b" is a distance between the cameras,
"Z" is the expected depth of the point (P2*a*, P2*b*) in the linear profile scene (120), and
"Un" is a normalized transverse coordinate of an image point (Pi) corresponding to the point observed in a two-dimensional image coordinate system of the first camera, where $$Un = \frac{(Ui - U0)}{f},$$

"Ui" being a transverse coordinate of the image point in an image plane of an image of the first camera (11),
"U0" being a centered coordinate in said image, and
"f" being a focal length of said first camera (11).

19. The calibration method as claimed in claim 4, wherein a yaw angle elementary variation dL between the first (11) camera and the second camera (12), as a function of an elementary depth deviation dZ, between a same point as observed (P1*a*, P1*b*) and as expected (P2*a*, P2*b*) of the observed profile of the scene (130; 13*a*, 13*b*) and of the expected linear profile of the scene (120), respectively, is given by the formula $$dL = \frac{-dZ * b}{(Z^2 * (1 + Un^2))},$$

where
"b" is a distance between the cameras,
"Z" is the expected depth of the point (P2*a*, P2*b*) in the linear profile scene (120), and
"Un" is a normalized transverse coordinate of an image point (Pi) corresponding to the point observed in a two-dimensional image coordinate system of the first camera, where $$Un = \frac{(Ui - U0)}{f},$$

"Ui" being a transverse coordinate of the image point in an image plane of an image of the first camera (11),
"U0" being a centered coordinate in said image, and
"f" being a focal length of said first camera (11).

20. The calibration method as claimed in claim 5, wherein a yaw angle elementary variation dL between the first (11) camera and the second camera (12), as a function of an elementary depth deviation dZ, between a same point as observed (P1*a*, P1*b*) and as expected (P2*a*, P2*b*) of the observed profile of the scene (130; 13*a*, 13*b*) and of the expected linear profile of the scene (120), respectively, is given by the formula $$dL = \frac{-dZ * b}{(Z^2 * (1 + Un^2))},$$

where
"b" is a distance between the cameras,
"Z" is the expected depth of the point (P2*a*, P2*b*) in the linear profile scene (120), and
"Un" is a normalized transverse coordinate of an image point (Pi) corresponding to the point observed in a two-dimensional image coordinate system of the first camera, where $$Un = \frac{(Ui - U0)}{f},$$

"Ui" being a transverse coordinate of the image point in an image plane of an image of the first camera (11),
"U0" being a centered coordinate in said image, and
"f" being a focal length of said first camera (11).

\* \* \* \* \*